United States Patent
Petruzzi

[11] 3,860,990
[45] Jan. 21, 1975

[54] PIZZA SAUCE SPREADER

[76] Inventor: Daniel J. Petruzzi, 679 N. Manhattan Ct., Hazleton, Pa. 18201

[22] Filed: July 3, 1973

[21] Appl. No.: 376,173

[52] U.S. Cl. .............................................. 15/104 S
[51] Int. Cl. .............................................. B05c 11/02
[58] Field of Search............ 15/104 S, 104 R, 235.6, 15/93 R, 236 R, 236 NO, 105; 118/13, 18; 425/426, 427; 404/112, 97, 96; 401/9, 128, 208, 261; 99/427, 450.6, 450.7, 494, 345; 222/533, 199, 200

[56] References Cited
UNITED STATES PATENTS

| | | | |
|---|---|---|---|
| 2,503,673 | 4/1950 | Lindquist | 118/18 |
| 2,851,003 | 9/1958 | Binsted et al. | 118/18 |
| 2,867,825 | 1/1959 | Breslaw | 401/9 X |
| 3,137,879 | 6/1964 | Dootson | 401/261 X |
| 3,380,432 | 4/1968 | Hester | 118/18 |
| 3,384,547 | 5/1968 | Palmerio et al. | 401/9 |
| 3,420,210 | 1/1969 | Lindquist | 118/18 |
| 3,596,590 | 8/1971 | Harris | 99/345 |
| 3,602,154 | 8/1971 | Schimkat | 99/450.7 |
| 3,648,596 | 3/1972 | Zito | 99/494 |
| 3,780,643 | 12/1973 | Papi | 99/450.7 |

Primary Examiner—Harvey C. Hornsby
Assistant Examiner—C. K. Moore
Attorney, Agent, or Firm—Clarence A. O'Brien; Harvey B. Jacobson

[57] ABSTRACT

The sauce deposited on the surface of a circular pizza shell is evenly spread by rotation of an implement extending diametrically across the shell and in contact with the sauce. Handle means is utilized to impart rotation about an axis centrally intersecting the pizza shell surface. The implement forms a spiral channel in contact with the sauce to effect radial displacement thereof when rotated.

21 Claims, 7 Drawing Figures

PIZZA SAUCE SPREADER

This invention relates to the uniform spreading of a viscous fluent material such as pizza sauce over the circular surface of a pizza shell and more particularly to a hand operated implement for evenly spreading sauce over a pizza shell.

In the production of pizza pies which are immediately distributed to the public at small or medium sized establishments or pizzerias, the spreading of pizza sauce on the pizza shell during preparation of the product, is time-consuming. The use of large and complex equipment for both dispensing the sauce and evenly distributing it over the pizza shell, while available for mass production operations, is not economically feasible or adaptable to small or medium sized pizza distributors. It is therefore an important object of the present invention to provide a relatively simple and inexpensive implement for evenly spreading sauce deposited onto a pizza shell from any dispenser.

In accordance with the present invention, an axially elongated spiral formation having a length substantially equal to the circular surface of the pizza shell, is rotated about an axis perpendicular to and centrally intersecting the circular pizza shell surface. Rotation of the spiral formation will not only angularly displace the sauce in contact therewith but will also radially displace the sauce so as to evenly cover the entire surface of the pizza shell. A handle structure is connected to the spiral formation in order to accommodate rotation thereof. In one embodiment of the invention, the spiral formation is positioned with its longitudinal axis parallel to the shell surface by means of a frame to which an annular element is connected for confining the sauce to the circular surface of the pizza shell while the sauce is being spread. The spiral formation is rotated by means of a shaft extending through a bearing portion of the frame and to which a crank handle is connected. The spiral formation may be in the form of a helical coil spring either connected directly to the rotational shaft or loosely mounted on a flexible rod to which the shaft is connected. Alternatively, the spiral formation may be in the form of a helical groove formed in the rod to which the rotational shaft is connected. In yet another form of the invention, the rod supporting the helical coil spring may be extended from its longitudinal ends upwardly so as to support a grip handle in spaced relation to the coil supporting rod. The coil supporting rod may then be rotated by means of the grip handle.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
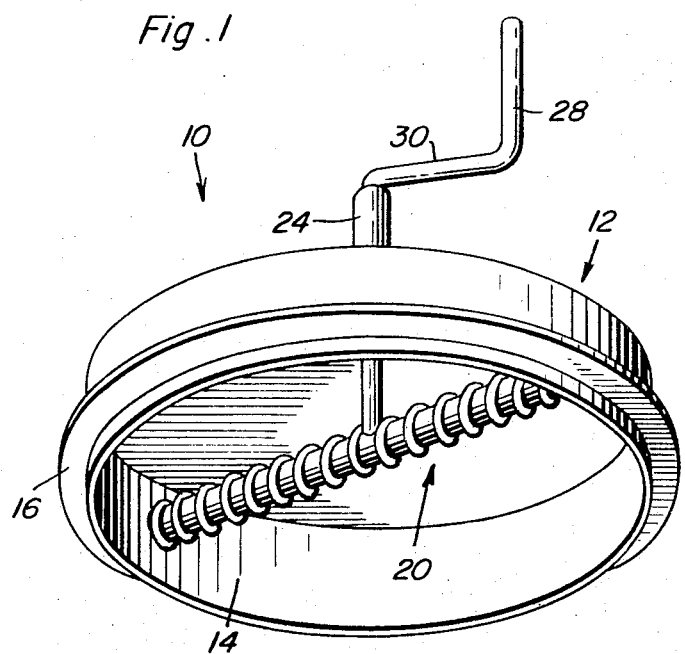
FIG. 1 is a perspective view illustrating one embodiment of the invention.
Figure 2:
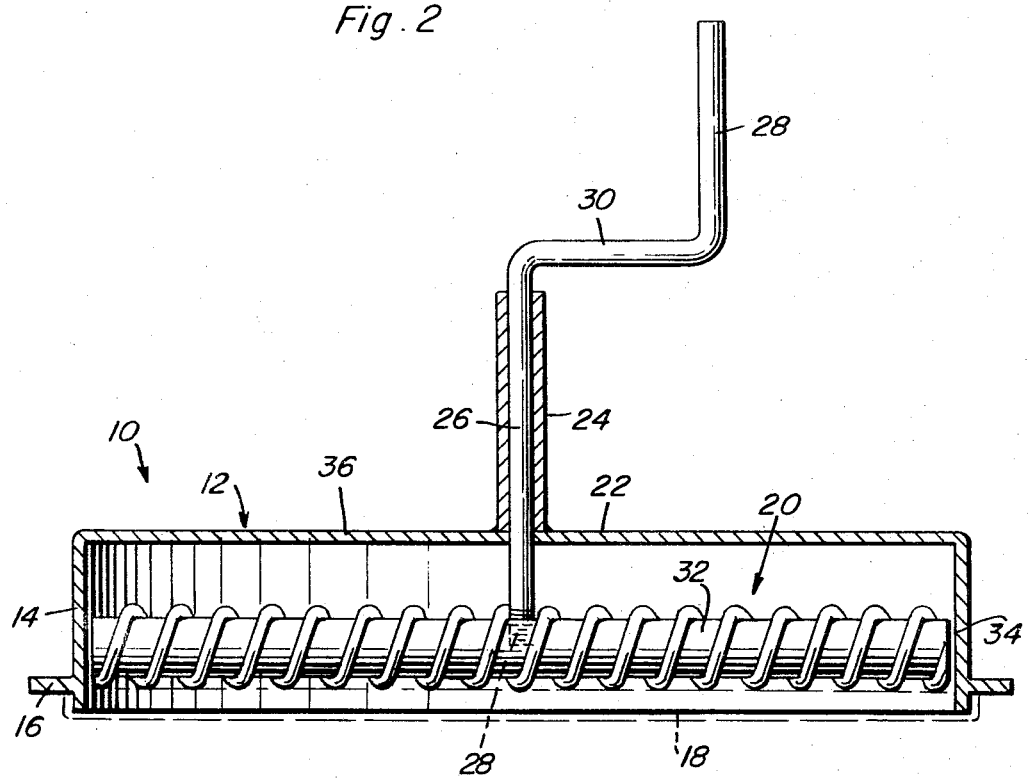
FIG. 2 is a side sectional view through the implement illustrated in FIG. 1.

Referring now to the drawings in detail, FIGS. 1 and 2 illustrate one embodiment of a sauce spreading implement generally referred to by reference numeral 10. The implement includes a cup-shaped frame member generally referred to by reference numeral 12 which includes an annular rim 14 from which an annular flange 16 extends. The rim and flange are adapted to peripherally engage a circular pizza shell 18 as shown by dotted line in FIG. 2 in order to confine pizza sauce deposited on the shell to its circular surface and at the same time position an elongated, sauce spreading component 20 with its longitudinal axis parallel to the surface of the pizza shell 18. Toward that end, the cup-shaped frame member 12 includes a top disk portion 22 to which a tubular bearing element 24 is centrally connected as by welding. A shaft 26 is journaled within the tubular bearing element 24 and has a lower threaded end portion 28 threadedly connected to the sauce spreading component 20. Thus, the component 20 is rotated about a rotational axis extending through the shaft 26, the rotational axis being positioned by the cup-shaped frame member 12 in perpendicular intersecting relationship to the surface of the pizza shell 18 and centrally aligned therewith. Rotation is imparted to the component 20 through the shaft 26 by means of a handle 28 connected by a crank 30 to the end of the shaft 26 opposite the threaded connecting end 28.

The sauce spreading component 20 in the embodiment illustrated in FIGS. 1 and 2, includes an elongated rod member 32 made of a flexible material and having a longitudinal length substantially equal to the circular surface over which the sauce is to be spread. Accordingly, the rod member 32 extends diametrically between and within the annular portion 14 of the cup-shaped frame member 12 and is provided with a threaded bore centrally located between its opposite longitudinal ends 34 in order to threadedly receive the connecting end 28 of the shaft 26. A coil spring 36 is loosely supported on the rod member 32 and extends between its opposite longitudinal ends so as to form a spiral channel peripherally about the rod member 32. The spiral channel formed between the coils of the coil spring 36 will therefore direct flow of sauce causing radial displacement thereof in response to rotation of the rod member.

The implement 10 is utilized by grasping it through its tubular bearing element 24 in one hand to place the annular flange 16 in contact with the periphery of the pizza shell as shown in FIG. 2. The rim portion 14 will then confine the sauce to the surface of the pizza shell and at the same time will position the component 20 so that its longitudinal axis is parallel to the shell surface and the coil spring 36 is in contact with the sauce. The component 20 is then rotated by means of the crank handle 28 in order to effect a spreading action because of the angular and radial displacement imparted to the sauce resulting in the uniform and even distribution of the sauce over the surface of the circular pizza shell.

Figure 3:
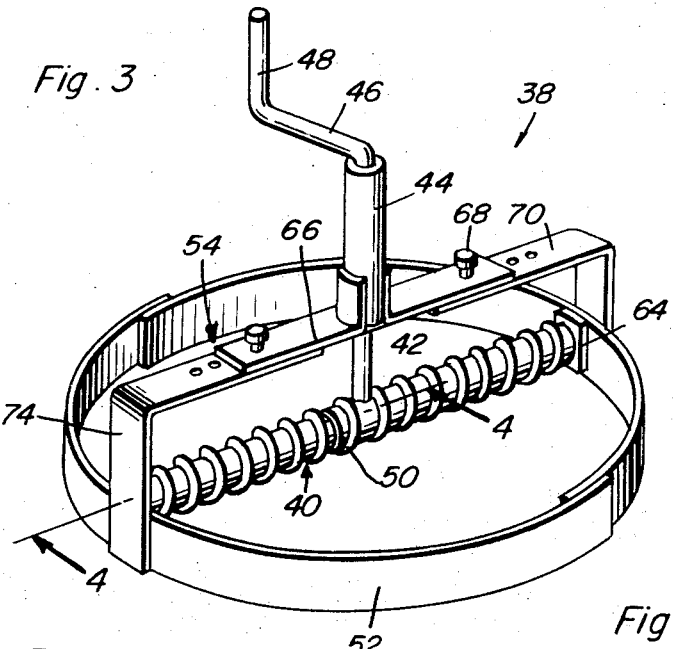
FIG. 3 is a perspective view showing another embodiment of the invention.

FIG. 3 illustrates a sauce spreading implement 38 that is utilized in the same manner as the implement 10 and operates in a similar fashion. The implement 38 also includes an elongated sauce spreading component 40 that is connected intermediate its ends to one end of a shaft 42 that is journaled within a tubular bearing element 44, the end of the shaft 42 opposite the component 40 being connected by a crank 46 to a crank handle 48 in order to impart rotation to the component 40 about a rotational axis extending through the shaft 42 and the tubular bearing element 44.

As in the case of the implement 10, the tubular bearing element 44 of implement 38 is grasped in one hand in order to position the component 40 parallel to the circular surface of a pizza shell so that the sauce deposited thereon may contact a coil spring 50 associated with the component 40 serving the same function as the coil spring 36 associated with the implement 10. The sauce is confined to the circular surface of the pizza shell by means of a pair of slidably overlapping semicircular strip sections 52 respectively connected to the tubular element by a pair of diametrically extending adjustable support arms 54.

Figure 4:
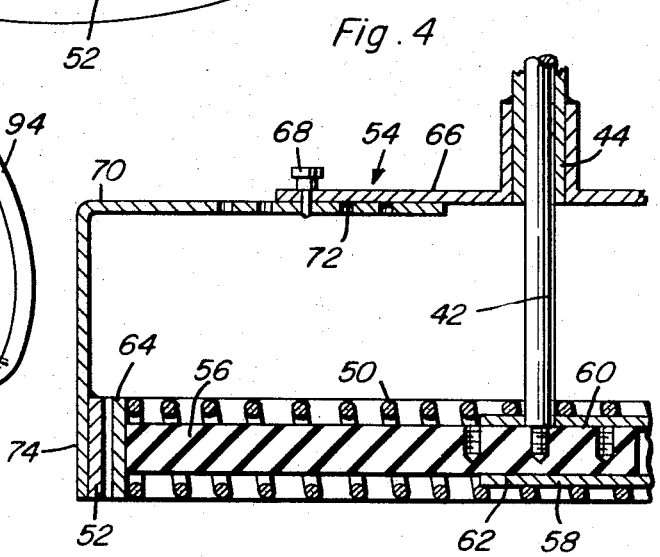
FIG. 4 is a partial sectional view taken substantially through a plane indicated by section line 4—4 in FIG. 3.

As more clearly seen in FIG. 4, each of the support arms 54 is radially adjustable in length in order to accommodate some variation in the size of the pizza shell over which the sauce is to be spread. Accordingly, the coil spring 50 is supported on a longitudinally extensible rod assembly which includes a rod section 56 slidably received within a hollow rod section 58, the rod section 56 having a plurality of threaded sockets 60 adapted to be aligned with an opening in the hollow rod section 58 so as to receive the threaded end 62 of the shaft 42. The shaft 42 may thereby be secured to the extensible rod assembly as well as to lock the rod assembly in a longitudinally adjusted length. Opposite ends of the rod assembly are provided with flanges 64 so as to confine the coil spring 50 therebetween. The length of the rod assembly will of course be adjusted so as to fit diametrically between the arcuate strip sections 52 that are adjustably positioned relative to the rotational axis through the shaft 42 by means of the adjustable arm assemblies 54. Each arm assembly includes therefore, a section 66 fixed as by welding to the tubular bearing element 44 and secured by a screw fastener 68 to a section 70 having a plurality of threaded openings 72, one of which receives the screw fastener 68. A downwardly depending portion 74 of the arm section 70 is secured to one of the semi-circular strip sections 52. Except for the adjustability feature associated with the implement 38, it is similar in construction and operation to the implement 10 hereinbefore described.

Figure 6:
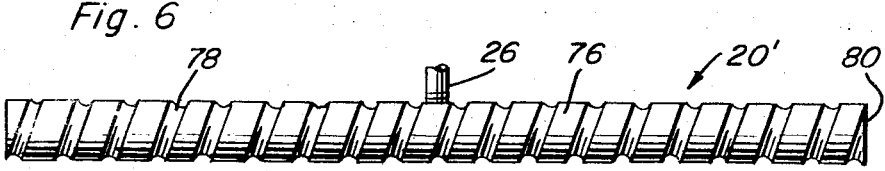
FIG. 6 is a side elevational view showing a modification of the implements illustrated in FIGS. 1 and 3.

The sauce spreading component 20 associated with the implement 10, could be replaced by a component 20' as shown in FIG. 6 which includes an elongated rod 76 of slightly larger diameter than the rod member 32. The rod 76 is provided with a helical or spiral groove 78 extending between its opposite longitudinal ends 80. The rod 76 like the rod 32, is of a length substantially equal to the diameter of the circular surface over which the sauce is to be spread and is rotated about a rotational axis through the shaft 26 as hereinbefore described in connection with the implement 10. Flow of sauce in a radial direction is however guided by means of the spiral groove 78 when the rod 76 is rotated.

Figure 7:
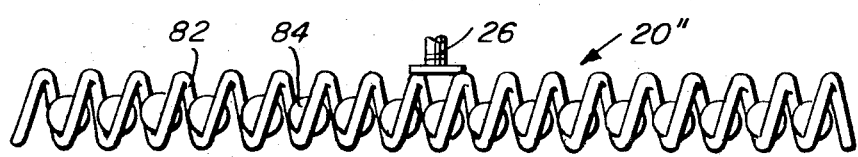
FIG. 7 is a side elevational view showing yet another modification of the aforementioned implements.

FIG. 7 illustrates yet another component 20'' adapted to be connected to one end of the shaft 26. The component 20'' comprises a coil spring 82 having an axial length equal to the longitudinal length of the component 20 or 20' hereinbefore described. Ball bearing elements 84 are trapped between the coils of the coil spring 82 in order to direct flow of sauce in contact with the coil spring 82 in a spiral path so as to produce radially outward movement in response to rotation of the component 20''.

Figure 5:
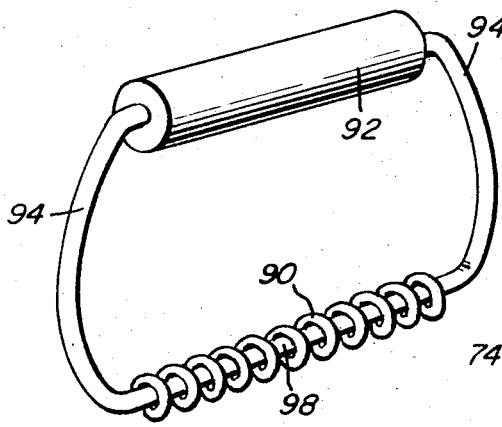
FIG. 5 is a perspective view illustrating yet another embodiment of the invention.

FIG. 5 illustrates a more simpler type of implement generally referred to by reference numeral 86. This implement includes a flexible rod portion 88 on which a coil spring 90 is loosely supported as in the case of the component 20 associated with implement 10. In order to manually rotate the rod 88 and the coil spring 90 supported thereon as in the case of the implements 10 and 38, a handgrip member 92 is connected to the rod 88 in parallel spaced relationship thereto by a pair of arcuate and upwardly extending extensions 94 that are interconnected with the ends of the rod 88. It will therefore be apparent, that in utilizing the implement 86, by manually imparting rotation to the rod 88 about a central vertical axis intersecting the surface of a pizza shell, sauce may be spread in accordance with the same principles associated with the implements 10 and 38 hereinbefore described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An implement for uniformly distributing a viscous fluent material over a substantially circular surface, comprising an elongated member of a length substantially equal to the diameter of said circular surface, handle means operatively connected to said member for rotation thereof about a rotational axis centrally intersecting said circular surface perpendicular to a longitudinal axis extending through said member, and spiral means peripherally mounted by said elongated member for radially displacing the fluent material in response to rotation of the member about said rotational axis.

2. The combination of claim 1 wherein said spiral means comprises a coil spring.

3. The combination of claim 2 including means connected to the handle means for positioning the longitudinal axis of said elongated member parallel to the circular surface with the spiral means in contact with the fluent material.

4. The combination of claim 3 wherein said handle means comprises a tubular bearing element connected to the positioning means, a shaft connected to the elongated member and extending through the tubular bearing element along said rotational axis, and crank means connected to the shaft for imparting rotation to the elongated member about said rotational axis.

5. The combination of claim 4 wherein said positioning means comprises an annular confining element peripherally engageable with said circular surface to limit radial displacement of the fluent material by the spiral means to said circular surface.

6. The combination of claim 5 wherein said elongated member is longitudinally extensible.

7. The combination of claim 6 wherein said circular surface is a pizza shell and the fluent material is pizza sauce.

8. The combination of claim 2 including flange means connected to opposite longitudinal ends of the elongated member for retaining said coil spring thereon.

9. The combination of claim 8 wherein said elongated member is longitudinally extensible.

10. The combination of claim 2 wherein said elongated member comprises a rod made of flexible material on which the coil spring is loosely supported.

11. The combination of claim 1 including means connected to the handle means for positioning the longitudinal axis of said elongated member parallel to the circular surface with the spiral means in contact with the fluent material.

12. The combination of claim 11 wherein said positioning means comprises an annular confining element peripherally engageable with said circular surface to limit radial displacement of the fluent material by the spiral means to said circular surface.

13. The combination of claim 11 wherein said handle means comprises a tubular bearing element connected to the positioning means, a shaft connected to the elongated member and extending through the tubular bearing element along said rotational axis, and crank means connected to the shaft for imparting rotation to the elongated member about said rotational axis.

14. The combination of claim 1 wherein said handle means comprises arcuate extensions of said elongated member and a handgrip member supported by said extensions in spaced relation to the spiral means.

15. The combination of claim 14 wherein said spiral means comprises a coil spring.

16. The combination of claim 1 wherein said spiral means comprises a helical groove formed in the elongated member.

17. An implement for uniformly distributing a viscous fluent material over a substantially circular surface, comprising annular means peripherally engageable with said circular surface for confining said fluent material thereto, bearing means connected to said annular means for establishing a rotational axis centrally intersecting said circular surface perpendicular thereto, spreading means rotationally supported by said bearing means within the annular means for radially displacing the fluent material in response to rotation relative to the annular means, and means connected to the spreading means for imparting rotation thereto about said rotational axis.

18. The combination of claim 17 wherein said spreading means includes a coil spring.

19. An implement for uniformly distributing a viscous fluent material over a substantially circular surface, comprising annular means peripherally engageable with said circular surface for confining said fluent material thereto, bearing means connected to said annular means for establishing a rotational axis centrally intersecting said circular surface perpendicular thereto, spreading means rotationally supported by said bearing means within the annular means for radially displacing the fluent material in response to rotation, and means connected to the spreading means for imparting rotation thereto about said rotational axis, said spreading means including a rod substantially equal in length to the diameter of said circular surface, and a coil spring loosely supported on the rod for contact with the fluent material.

20. The combination of claim 17 wherein said spreading means comprises an elongated rod having a spiral groove formed therein.

21. The combination of claim 17 wherein said spreading means includes a spiral element having an axial length substantially equal to the diameter of said circular surface for contact with said fluent material.

* * * * *